US009877226B2

(12) United States Patent
Kotecha et al.

(10) Patent No.: US 9,877,226 B2
(45) Date of Patent: *Jan. 23, 2018

(54) DYNAMICALLY PROVISIONING SUBSCRIBERS TO MANAGE NETWORK TRAFFIC

(71) Applicants: Verizon Patent and Licensing Inc., Arlington, VA (US); Cellco Partnership, Basking Ridge, NJ (US)

(72) Inventors: Lalit R. Kotecha, San Ramon, CA (US); John F. Macias, Antelope, CA (US); Patricia R. Chang, San Ramon, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,112

(22) Filed: May 26, 2016

(65) Prior Publication Data

US 2016/0269928 A1 Sep. 15, 2016

Related U.S. Application Data

(63) Continuation of application No. 13/407,031, filed on Feb. 28, 2012, now Pat. No. 9,374,289.

(51) Int. Cl.
*H04W 28/02* (2009.01)
*H04L 12/26* (2006.01)

(52) U.S. Cl.
CPC ..... *H04W 28/0268* (2013.01); *H04L 43/0882* (2013.01); *H04L 43/16* (2013.01); *H04W 28/0284* (2013.01); *H04W 28/0289* (2013.01)

(58) Field of Classification Search
None
See application file for complete search history.

(56) References Cited

U.S. PATENT DOCUMENTS

| 2009/0282127 | A1* | 11/2009 | Leblanc | H04L 12/5695 709/219 |
| 2010/0023699 | A1* | 1/2010 | Reidel | G06Q 10/06 711/134 |
| 2012/0163203 | A1* | 6/2012 | Wilkinson | H04L 41/5025 370/252 |
| 2012/0303795 | A1 | 11/2012 | Mo et al. | |
| 2013/0086252 | A1 | 4/2013 | Cutler et al. | |
| 2013/0088997 | A1* | 4/2013 | Briscoe | H04L 47/10 370/252 |
| 2013/0229920 | A1* | 9/2013 | Johansson | H04L 47/11 370/235 |
| 2014/0241161 | A1* | 8/2014 | Tornkvist | H04W 24/02 370/235 |

* cited by examiner

*Primary Examiner* — Adnan Baig

(57) ABSTRACT

A system comprising: one or more server devices to: set a first network threshold level for determining network congestion in a network; set rate limiting criteria for determining when one or more subscribers will be rate limited; detect an increase in network congestion at a base station above the first network threshold level; identify one or more subscribers meeting one or more of the rate limiting criteria; rate limit network traffic associated with the one or more subscribers; detect a decrease in network congestion at the base station below a second network threshold level; and remove the rate limiting of the network traffic associated with the one or more subscribers.

20 Claims, 6 Drawing Sheets

DYNAMICALLY PROVISIONING SUBSCRIBERS TO MANAGE NETWORK TRAFFIC

CROSS REFERENCE TO RELATED APPLICATIONS

This application is a continuation of U.S. patent application Ser. No. 13/407,031 filed on Feb. 28, 2012, the contents of which are hereby incorporated herein by reference in their entirety.

BACKGROUND

A fourth generation (4G) wireless network is an Internet protocol (IP) wireless access network in which different advanced multimedia application services (e.g., voice over IP (VoIP) content, video content, etc.) are delivered over IP. As wireless network data rates improve using 4G technologies, more and more bandwidth-intensive applications and devices are being developed. For example, some mobile devices, such as smart mobile devices like iPhone and Android devices, may receive high bit rates of 10-50 megabits per second (Mbps) or more, which is significantly more data than a typical cellular phone. In a multiple access network, these different devices and multimedia application services compete for the same air interface and transport network resources.

Quality of Service (QoS) refers to a measure of network performance. QoS issues may arise due to network problems, such as network congestion, latency, or jitter. Other QoS issues may arise due to faults or miscommunications with hardware (e.g., server devices, customer equipment, etc.). QoS problems can be exasperated when one or more subscribers utilize a disproportionately high amount of network bandwidth during times of otherwise high network congestion, which in turn can leave other subscribers with a disproportionately low amount of available network resources.

DETAILED DESCRIPTION OF PREFERRED EMBODIMENTS

Figure 1A:
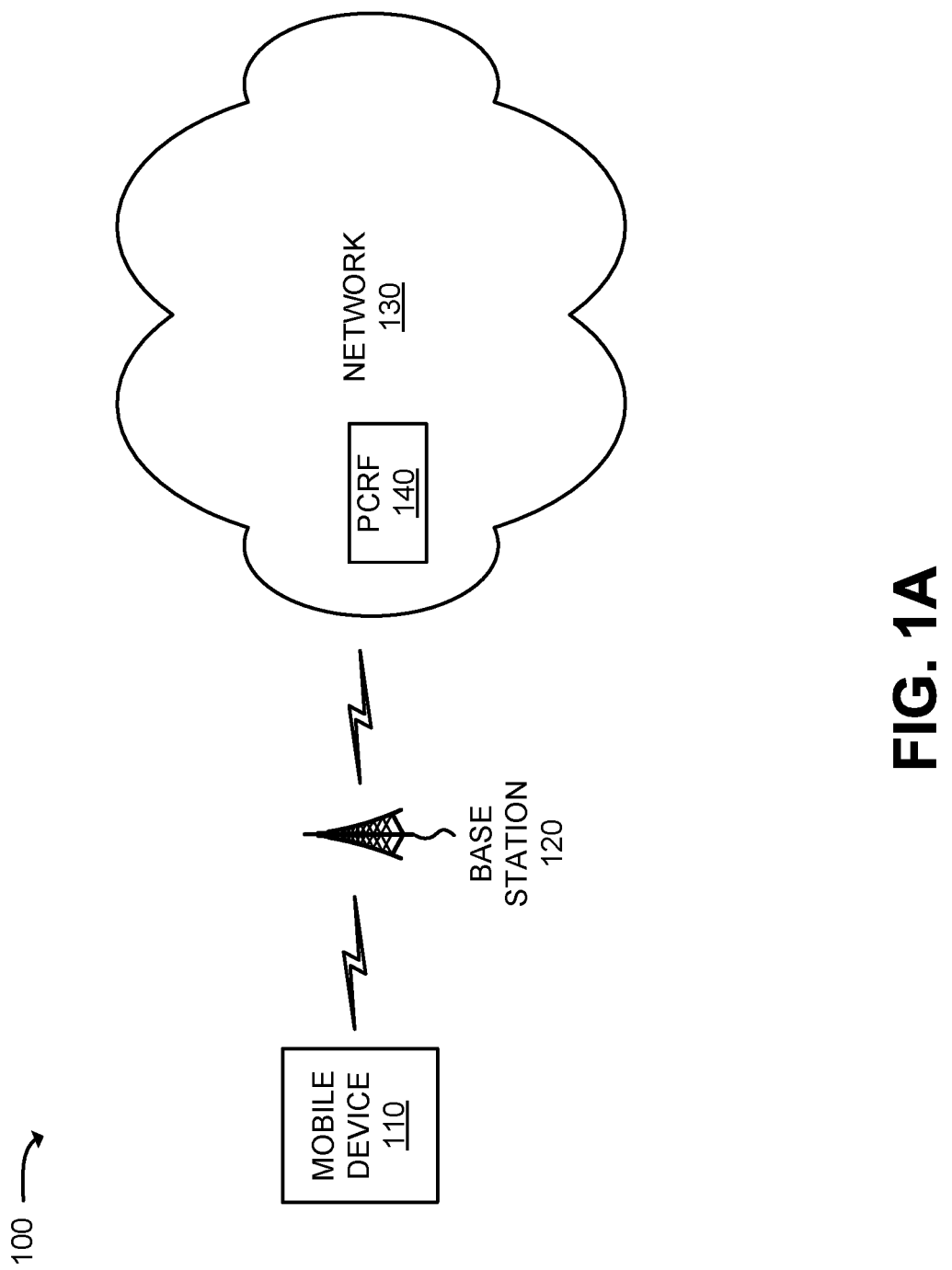
FIGS. 1A and 1B are diagrams illustrating an example environment in which systems and/or methods, described herein, may be implemented.

The following detailed description refers to the accompanying drawings. The same reference numbers in different drawings may identify the same or similar elements.

A system and/or method, described herein, may dynamically provision network subscribers to manage network traffic. In an implementation described herein, an example system is provided that can dynamically provision network subscribers by throttling or rate limiting one or more subscribers during periods of high network congestion to alleviate network congestion.

Dynamic provisioning can be based on subscriber usage, current or historic, in combination with current network conditions. For example, during periods of high network congestion, subscribers who use more than a threshold amount of data (e.g., heavy use subscribers) can be rate limited or throttled, such that their access to the network has lower priority than other subscribers who use less than the threshold amount of data (e.g., light use subscribers). By rate limiting heavy use subscribers, the additional congestion caused by their heavy use can be reduced, which can disproportionately alleviate network congestion compared to rate limiting light use subscribers. Alternatively, all subscribers can be subjected to rate limiting beyond a threshold level to allow for each subscriber to access a minimum amount of data even during periods of high network congestion, such that each subscriber can have a minimum guaranteed QoS.

Subscribers can be dynamically provisioned by throttling or rate limiting one or more subscribers. In one implementation, one or more subscribers can be throttled or rate limited by one of several methods, such as adjusting priorities of network access or bit rates (e.g., changing the priority of the subscriber's packet forwarding), discarding packets (e.g., policing), delaying packets in transit (e.g., queuing), manipulating congestion mechanisms (e.g., congestion control), setting or changing transfer rate limits, etc. As used herein, the terms throttling and rate limiting are used interchangeably to describe throttling or rate limiting by any available mechanism including those listed above.

One method of dynamic provisioning listed above can include adjusting priorities of network access or bit rates. In one implementation, heavy use subscribers can be rate limited by adjusting priorities on their packet forwarding priority (e.g., priority of forwarding their packets containing data and content requests over other subscribers' packets containing data and content requests).

Priority assignments can be used to access base station 120-specific parameters that control packet forwarding priority. Based on priority assignments, the forwarding priority of packets can be pre-configured to send some packets with a higher priority than other packets. Depending on the wireless technology used, priority can be set in different ways. For example, dynamic provisioning can change a particular forwarding priority class to rate limit particular packets. For example, the forwarding priority class can be lowered for heavy use subscribers, thus rate limiting particular packets for the heavy use subscribers by lowering the forwarding priority for packets of the heavy use subscribers.

Dynamic provisioning can also be done by any other method of rate limiting available. For example, in order to conserve bandwidth, bandwidth can be limited to all or some subscribers. Thus, if a subscriber attempts to utilize more than their allotted bandwidth, the subscriber would be rate limited to their allotted bandwidth.

FIG. 1A is a diagram illustrating an example environment 100 in which systems and/or methods, described herein, may be implemented. As shown in FIG. 1A, example environment 100 can include a mobile device 110, a base station 120, a network 130, and a policy charging and rules function (PCRF) server 140. In one implementation, PCRF server 140 can be used to dynamically provision subscribers to manage network traffic. A single mobile device 110, base station 120, network 130, and PCRF server 140 have been illustrated in FIG. 1A for simplicity. In practice, there may be additional mobile devices 110, base stations 120, networks 130, and/or PCRF servers 140.

Mobile device 110 may include any device capable of communicating via a network. For example, mobile device 110 may correspond to a mobile communication device (e.g., a mobile phone, a smart phone, a personal digital assistant (PDA), or a wireline telephone), a computer device (e.g., a laptop computer, a tablet computer, or a personal computer), a gaming device, a set top box, or another type of communication or computation device.

Base station 120 may include one or more computation and/or communication devices that receive voice and/or data and transmit that voice and/or data to mobile device 110. Base station 120 may also receive voice and/or data transmitted from mobile device 110. In one implementation, base station 120 may utilize LTE standards operating in a 700 MHz frequency band (e.g., base station 120 may be a base station in an LTE network). In the context of an LTE network, base station 120 may also be referred to as an eNodeB or eNB. Base station 120 may provide a radio interface for network 130.

Base station 120 may be associated with one or more geographical service areas surrounding base station 120. The service areas may be referred to as wireless sectors that are defined by the radio range of base station 120. A single sector, corresponding to base stations 120, is shown as sector 190 in FIG. 1B.

Network 130 may include a network that provides connectivity to base station 120. Network 130 may include a local area network (LAN), a wide area network (WAN), a metropolitan area network (MAN), other types of networks, or a combination of networks. In one implementation, network 130 may take the form of an LTE network. In another implementation, other networks, such as a network that provides a wireless (radio) interface to mobile devices 110 using the 3rd generation (3G) mobile telecommunications standards, other 4th generation (4G) mobile telecommunications standards different from an LTE network, or future networks, such as a 5th generation (5G) network, may be used. 4G networks can include, in addition to or as alternative to an LTE network, other radio access networks, such as an enhanced high rate packet data (eHRPD) network, and/or a wireless core network (e.g., referred to as an evolved packet core (EPC) network). An LTE network, such as network 130, is often called an evolved universal terrestrial radio access network (E-UTRAN). An EPC network can be an all-internet protocol (IP) packet-switched core network that supports high-speed wireless and wireline broadband access technologies. An evolved packet system (EPS) is defined to include an LTE (or eHRPD) network and an EPC network.

PCRF server 140 may be a server that may access subscriber databases and other resources to make policy decisions relating to subscribers (e.g., users of mobile device 110). The policy decisions may relate to, for example, QoS decisions and charging rules. In one implementation, PCRF server 140 can be used to raise or lower bandwidths (e.g., maximum bit rate or average maximum bit rate) of subscribers, charge subscribers based on their volume of network data usage, charge subscribers for QoS guarantees, and/or limit application usage for certain events (e.g., time of day, load conditions, etc.).

PCRF server 140 can decide to adjust bit rates or network priorities based on a number of factors, such as time of day, load conditions, subscriber information, policy information, etc. For example, during periods of heavy load conditions, PCRF server 140 can lower bit rates (e.g., throttle bit rates) or network priorities for heavy use subscribers to conserve bandwidth for the network. As another example, during periods of light load conditions, PCRF server 140 can raise bit rates or raise network priorities of subscribers including heavy use subscribers.

PCRF server 140 can change network priorities by changing a QoS classification identifier (QCI) assigned to one or more subscribers. A QoS policy may include one or more forwarding classifications (e.g., QCI values) that correspond to one or more types of traffic and/or services (e.g., streaming video, streaming audio, Internet traffic, gaming, data, etc.) being transported via a network.

Each type of traffic and/or service may be associated with a respective QCI value (e.g., 1, 2, 3, etc.) that corresponds to a respective forwarding priority, data rate, bandwidth, probability of packet loss, etc. for each type of traffic and/or service. QCI values control packet forwarding treatment (e.g., scheduling weights, admission thresholds, queue management thresholds, etc.). QCI can be pre-configured and can be used to determine packet forwarding by assigning a QCI value to a packet, and treating the packet according the QCI value and the corresponding packet forwarding treatment. For example, a QCI value of 1-9 can have a network priority of 1-9 for LTE networks. Based on the network priority, packets with lower QCI priority can have priority over other packets with higher QCI priority. For example, a packet with a QCI priority of 8 would have a higher QCI priority than a packet with a QCI priority of 9.

A QCI priority can also be changed based on loading for selected subscribers to dynamically provision subscribers and manage network traffic. PCRF server 140 can increase or decrease the QCI priorities assigned to one or more subscribers to increase or decrease the packet priority and, thus, the level of service available to the one or more subscribers. In one implementation, the QCI can be lowered for heavy use subscribers during peak network congestion to increase the availability of bandwidth during the peak network congestion. For example, during times of high network congestion, the QCI priority can be decreased for heavy application subscribers.

By lowering the QCI priority, the forwarding priority, data rate, bandwidth, probability of packet loss, etc. for each type of traffic and/or service can be reduced and can allow higher QCI traffic and/or service to experience increased QoS for all subscribers except the heavy use subscribers. For example, during times of heavy load, heavy use subscribers using a QCI with a priority of 8, can be changed to a QCI with a priority of 9 to lower the network priority for the heavy use subscribers to below light use subscribers, who could still be using a QCI with a priority of 8 (e.g., a higher priority than heavy use subscribers).

Alternatively, the QCI can be changed based on loading for all subscribers to dynamically provision subscribers and manage network traffic. In one implementation, the QCI can be lowered for all subscribers such that each subscriber's QCI is a minimum level. For example, the QCI can be set for each subscriber to a minimum QoS during peak network congestion.

Additionally, or alternatively, PCRF server 140 can move or offload heavy use subscribers to other technologies. For example, PCRF server 140 can move heavy use subscribers from an LTE network to a 3G network.

Subscribers can be identified or classified by their usage, such as threshold amounts and/or usage within specific time periods. In one implementation, a threshold can be set at a fixed amount of bandwidth or a percentage of the bandwidth (e.g., during high, medium, and/or low network congestion periods). For example, a subscriber can also be identified as a heavy use subscriber if the subscriber exceeds 10% of the bandwidth for a base station 120.

In another implementation, the type of subscriber can be taken into account for identification and classification. For example, premium subscribers can be differentiated from regular subscribers and heavy use premium subscribers can be exempted from having their bandwidth throttled.

In one implementation, usage within specific time periods can be set based upon usage over a set amount of time (e.g., the past week, a previous billing cycle, the past year, etc.) or within a moving window (e.g., current usage, or the past 20 minutes, 60 minutes, 2 hours, etc. of usage). For example, a subscriber can be identified as a heavy use subscriber if the subscriber uses a high amount of data over the past week or within the last 20 minutes.

In another implementation, a heavy use subscriber can be identified based on a weighting of historic usage and current usage in base station 120. For example, a heavy use subscriber can be identified by heavy usage over the past month in combination with moderate current usage.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Figure 1B:
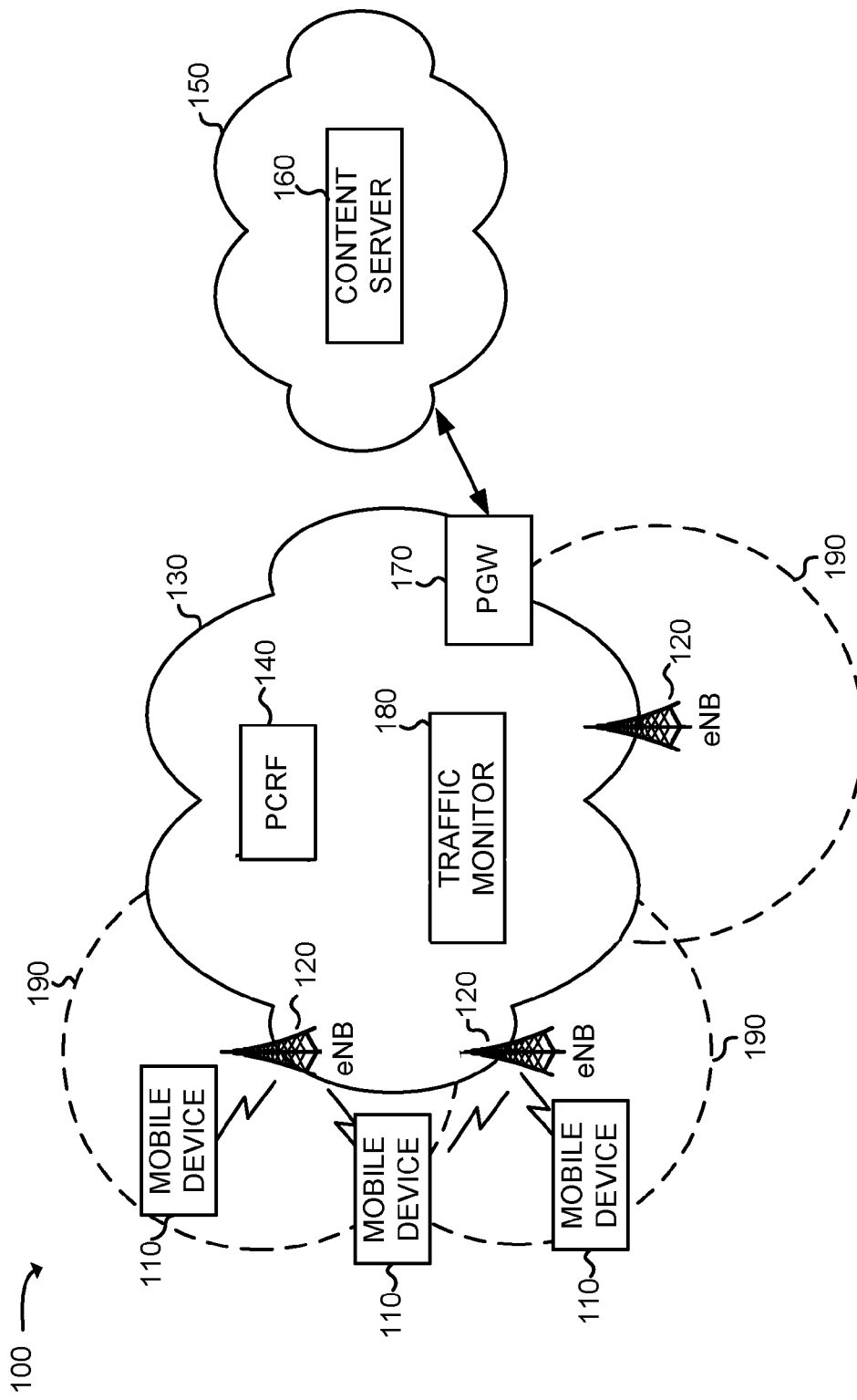

FIG. 1B is a diagram illustrating an example environment 100 in which systems and/or methods, described herein, may be implemented. As shown in FIG. 1B, example environment 100 can include mobile devices 110, base stations (eNodeB or eNB) 120, network 130, PCRF server 140, packet network 150, and content server 160. Network 130 may provide wireless broadband services to a number of mobile devices 110. The components of network 130 may include base stations (eNBs) 120 with sectors 190, a packet data network gateway (PGW) 170, and a traffic monitor 180. In general, a number of other networks devices, which are not shown herein for clarity, may also be used in the implementation of network 130.

Network 130 may also connect to other networks, such as an external packet network 150. In some implementations, in addition to serving mobile devices 110, network 130 may also provide wireless service to stationary internet devices, such as wireless hubs, that can connect a home computer or router to a wireless network.

Packet network 150 may include, for example, a public packet-based network, such as the Internet.

One or more servers, such as content server 160, may be connected to or located within packet network 150. Content server 160 may include devices designed to provide content to mobile device 110. The provided content may include, for examples, movies, television shows, or other multimedia content, that is delivered to mobile device 110 in response to a request from mobile device 110. The video may be delivered, for instance, as IP unicast traffic. Although content server 160 is shown as part of packet network 150, in an alternative implementation, content server 160 may be part of another network, such as network 130 and/or an LTE network.

PGW 170 may include one or more devices that may be connected to packet network 150 and connected to or located within network 130. PGW 170 may provide connectivity to external networks, such as packet network 150. Mobile device 110 may have simultaneous connectivity with more than one PGW 170 to multiple additional networks. PGW 170 may perform, for example, policy enforcement, packet filtering for each subscriber, charging support, lawful interception, and/or packet screening.

Traffic monitor 180 may include one or more devices that monitor traffic at base stations 120. In one implementation, traffic monitor 180 may keep track of the radio interfaces of base stations 120. For example, traffic monitor 180 may track the total number of connected subscribers in each of sectors 190, the total bandwidth being used in sectors 190, the amount of free bandwidth in each of sectors 190, and/or some other metric relating to a current congestion or load level at base station 120. Traffic monitor 180 may receive information relating to the load/congestion of a sector 190 from base stations 120 and/or from PGW 170.

Traffic monitor 180 and PCRF server 140 (along with other components in environment 100) can work together to monitor QoS for one or more subscribers in a sector 190, and to adjust the QCI for one or more subscribers based upon the monitored QoS to dynamically provision bandwidths for subscribers to manage network traffic.

Although FIG. 1B illustrates components in a portion of environment 100, in other implementations, the portion of environment 100 may include additional components, fewer components, different components, or differently arranged components than those illustrated in FIGS. 1A and 1B, and described herein. Alternatively, or additionally, one or more components of the portion of environment 100 may perform one or more tasks described as being performed by one or more other components of the portion of environment 100.

Figure 2:
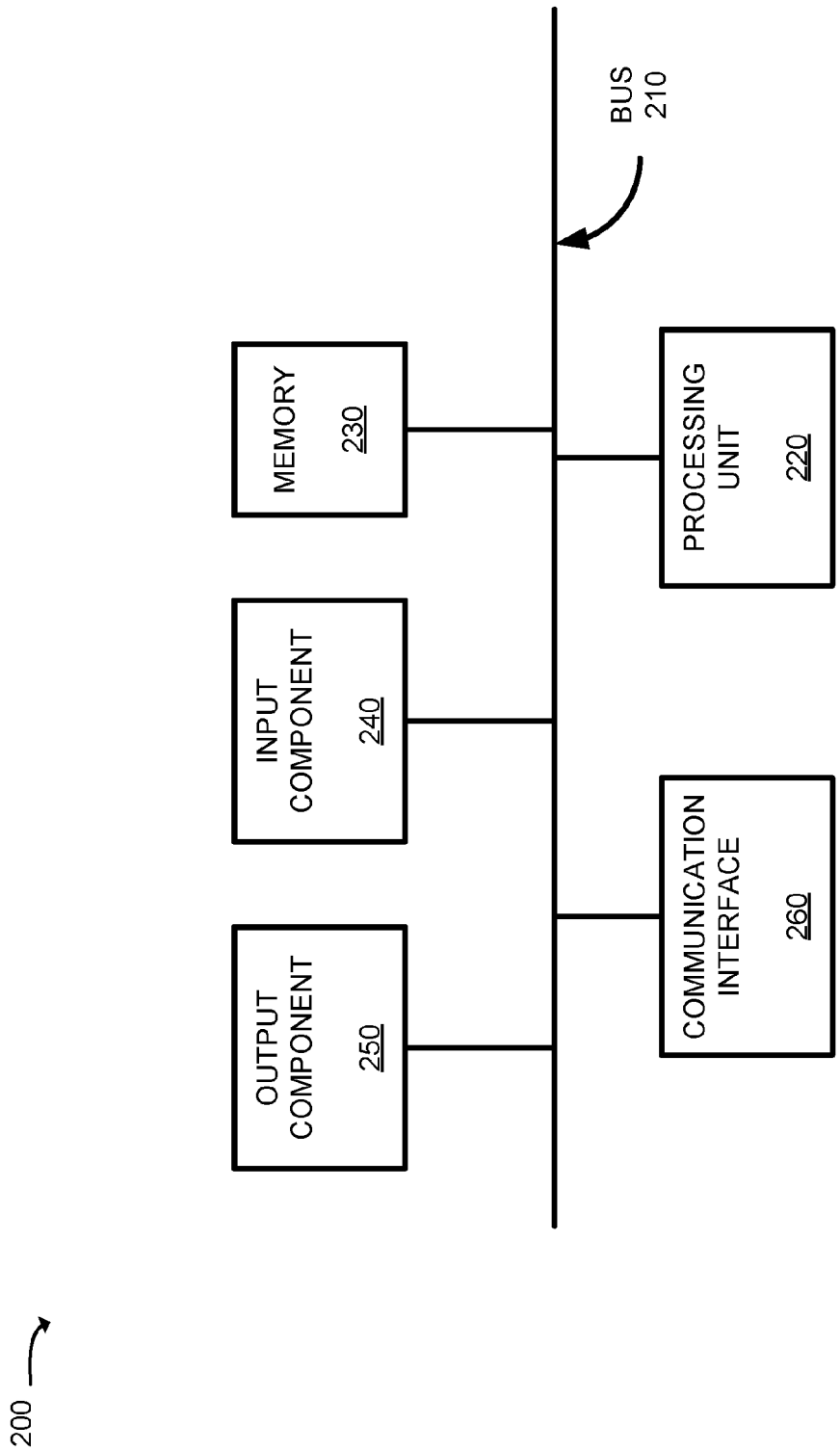
FIG. 2 is a diagram of example components of one or more of the devices of FIGS. 1A and 1B.

FIG. 2 is a diagram of example components of a device 200 that may correspond to one of the components of mobile device 110, base station 120, network 130, or packet network 150 (e.g., content server 160, PGW 170, PCRF server 140, traffic monitor 180, etc.). As illustrated, device 200 may include a bus 210, a processing unit 220, a memory 230, an input component 240, an output component 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input component 240 may include a device that permits an operator to input information to device 200, such as a button, a switch, a keyboard, a keypad, a mouse, or the like. Output component 250 may include a device that outputs information to the operator, such as a display, a speaker, a light emitting diode (LED), etc.

Communication interface 260 may include any transceiver-like mechanism that enables device 200 to communicate with other devices and/or systems. For example, communication interface 260 may include receiver and/or transmitter components for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
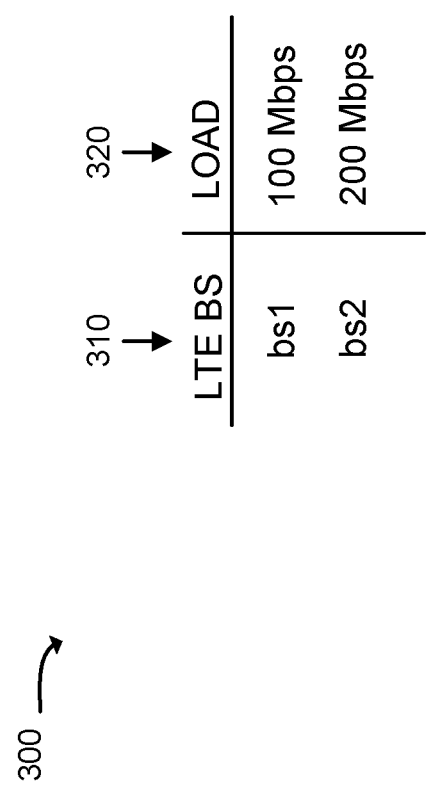
FIG. 3 is a diagram illustrating an example of a data structure that may be maintained by a traffic monitor according to an implementation described herein.

FIG. 3 is a diagram illustrating an example of a data structure 300 that may be maintained by traffic monitor 180 according to an LTE implementation described herein. Data structure 300 may include LTE base station (LTE BS) field 310 and load field 320.

LTE base station field 310 may store, for each entry in data structure 300, a value identifying a particular base station 120. LTE base station field 310 may include, for example, a character sequence that uniquely identifies a particular base station 120 in network 130. In an alternative implementation, instead of identifying base stations 120, LTE base station field 310 may identify particular sectors maintained by base stations 120.

Load field 320 may store an indication of the traffic load that is being experienced by the corresponding base station 120. In various implementations, the traffic load for base station 120 may be expressed in a number of ways, such as an average traffic load of base station 120 over a predetermined time period, the peak load in the sector over a predetermined time period, a number of subscribers connected to base station 120, etc. In the example of FIG. 3, load field 320 may be expressed as the aggregate average load for base station 120 over a certain period, such as the previous 10 minutes. Thus, for the base station 120 labeled "bs1," the average load over the last 10 minutes is illustrated as 100 Mbps (mega bits per second), and for base station 120 labeled "bs2," the average load over the last 10 minutes is illustrated as 200 Mbps.

The fields shown for data structure 300 are examples of possible fields that may be maintained by traffic monitor 180. In alternative implementations, different fields, additional fields, or fewer fields may be used in data structure 300.

Figure 4:
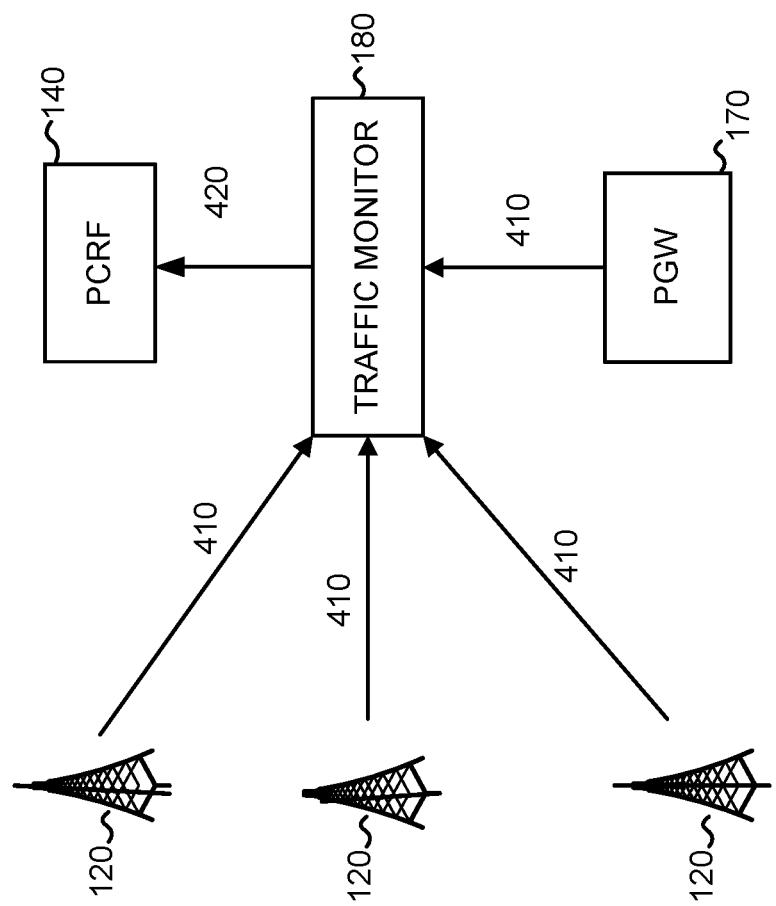
FIG. 4 is a diagram illustrating example communication paths between components of FIG. 1B according to an implementation described herein.

FIG. 4 is a diagram illustrating example communication paths between components of FIG. 1B according to an implementation described herein. As illustrated in FIG. 4, base stations 120 can connect via traffic monitor 180 to PCRF server 140 and PGW 170. Sector load information 410 may be periodically or occasionally received, by traffic monitor 180, from base stations 120 and/or from PGW 170. Sector load information 410 may include the average traffic load of a sector and/or base station 120 over a predetermined time period, the peak load in the sector and/or base station 120 over the predetermined time period, etc. Sector load information 410 can indicate whether network congestion or QoS problems may be occurring at base station 120.

Traffic monitor 180 may maintain and may provide network load information 420 to PCRF server 140 based on sector load information 410 for various sectors 190 of network 130. Network load information 420 may be provided to PCRF server 140 at certain intervals or on request from PCRF server 140. For example, PCRF server 140 may send a request to traffic monitor 180 for the current network load information 420 associated with a particular base station 120 or sector 190. In response, traffic monitor 180 may find the network load information 420 and transmit the network load information 420 to PCRF server 140.

A number of communication paths are illustrated in FIG. 4. Additional, different, or fewer communication paths may, in some implementations, be used in network 130.

Figure 5:
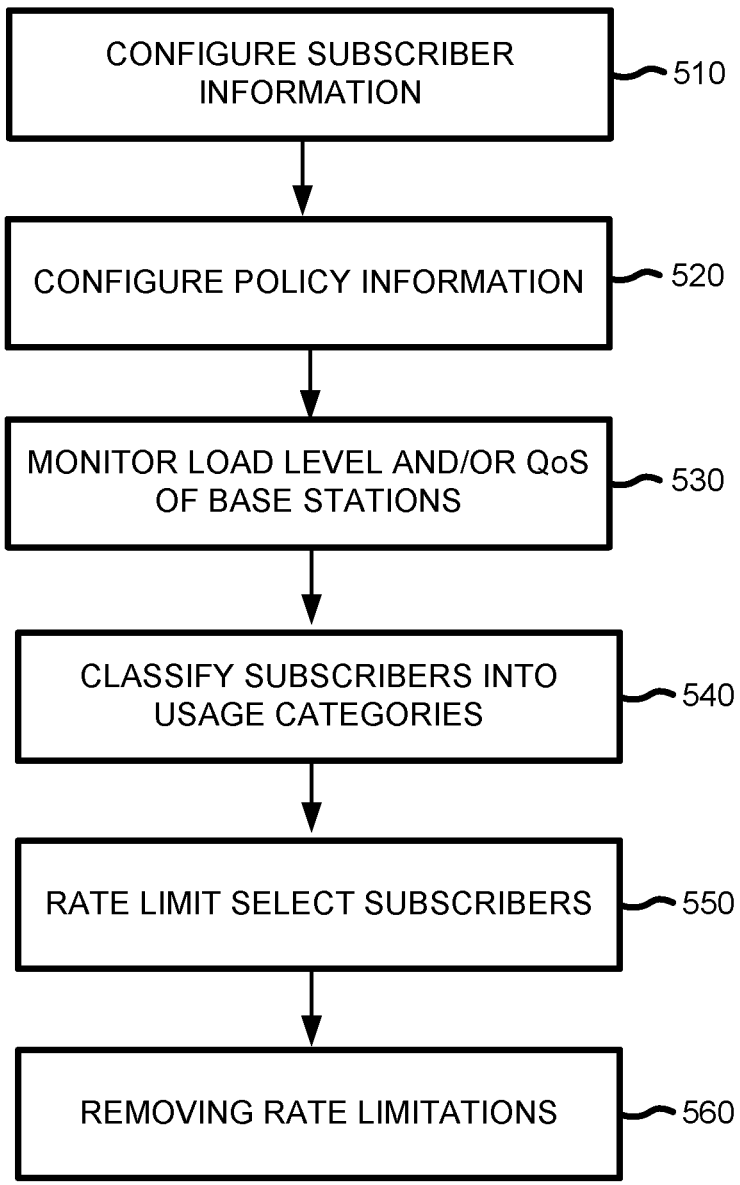
FIG. 5 is a flow chart of an example process for dynamically provisioning subscribers according to an implementation described herein.

FIG. 5 is a flow chart of an example process 500 for dynamically provisioning subscribers according to an implementation described herein. Process 500 may allow for dynamic provisioning of subscribers into a load priority queue or to regulate QCI and network traffic in a network.

Process 500 may include configuring subscriber information (block 510). The configuring may be performed by one or more server devices, such as PCRF server 140. The subscriber information can be used to adjust policies for specific subscribers based upon their subscriptions to standard and premium services (e.g., QoS guarantees, higher network usage packages, etc.) or other factors that may be subscriber specific (e.g., long term customer, network administration, special customer status, etc.).

In one implementation, subscriber information can be configured based on information regarding a specific subscriber. For example, subscriber information can be configured to include information from subscriber databases, such as a subscriber billing database, which can indicate whether a subscriber opts to purchase QoS guarantees, has a history of heavy network usage over a particular threshold of use over a time period, such as a billing cycle, is currently using network data above a particular threshold in a particular base station 120, etc. Additionally, the subscriber information can be configured based on weighting certain factors more heavily than other factors. For example, opting to purchase QoS guarantees and current network usage can be given more weight to configuring subscriber information than historical network usage.

The subscriber information may define threshold information for a load value at which a subscriber's network access may be throttled down (e.g., the subscriber will have slower or reduced priority access to the network). The threshold information may be, for example, statically programmed by an administrator. Alternatively, the threshold information may be dynamically determined based on, for example, the total capacity of a particular base station 120 or based on other information. In some implementations, a threshold value may be set for all base stations 120. Alternatively, the threshold values may be set on a per-base station 120 basis. In other words, the threshold value for one base station 120 may differ from the threshold value for another base station 120.

Process 500 may include configuring policy information (block 520). The configuring may be performed by one or more server devices, such as PCRF server 140. The policy information can be used to determine which policies should be applied to one or more specific subscribers based upon policies set for particular categories of subscribers. For example, policy information can include lowering QCI for specific subscribers based upon their subscriber information matching with particular policies (e.g., QoS guarantees for specific subscribers being enforced according to policy information).

In one implementation, policy information can be configured based on information regarding the network and policies set by the network administration. For example, policy information may be configured to throttle usage of heavy subscribers based on their subscriber information, reserve network bandwidth for subscribers who pay for QoS guarantees, reserve a minimal amount of bandwidth for each subscriber during their historic times of use (e.g., if a subscriber primarily accesses the network from 6-7 am, the policy can be configured to reserve a particular amount of bandwidth for that subscriber from 6-7 am), etc.

Process 500 may include monitoring load level and/or QoS of base stations 120 (block 520). Monitoring load level and/or QoS of base stations 120 can be performed by one or more server devices, such as traffic monitor 180. Monitoring load level and/or QoS of base stations 120 can be performed to identify QoS degradation and to identify any specific subscribers that may experience the identified QoS degradation. In one implementation, traffic monitor 180 can monitor one or more base stations 120 to monitor the condition of load level and/or QoS of base stations 120 for QoS degradation (e.g., network congestion, latency, or jitter).

Process 500 may include classifying subscribers into usage categories (block 540). Classifying subscribers into usage categories can be performed by one or more server devices, such as PCRF server 140. Subscribers can be classified into any identifiable category, such as heavy users, light users, prime time users, off time users, etc., and can be used to dynamically provision subscribers into a load priority queue based upon whether each subscriber exceeds one or more threshold levels. One or more threshold levels can be determined by the subscriber information and/or the policy information that apply to each specific subscriber or a category of subscribers. For example, a subscriber (or category of subscribers) can have a higher threshold level if the subscriber (or category of subscribers) pays for higher QoS guarantees, or a lower threshold level if they do not pay for QoS guarantees.

In one implementation, subscribers can be classified into usage categories, such as heavy subscribers if their network usage, historically or currently, exceed their threshold level (s). For example, a subscriber can be classified as a heavy user if the subscriber's current or historic usage exceeds the subscriber's threshold historically, during specific times, during particular events, etc. Likewise, a subscriber can be classified as a light user if the subscriber's current or historic usage did not exceed the subscriber's threshold historically, during specific times, during particular events, etc.

Process 500 may include rate limiting select subscribers (block 550). Rate limiting select subscribers can be performed by one or more server devices, such as PCRF server 140 possibly in combination with base stations 120 and PGW 170. Rate limiting select subscribers can be based on the policy information, classifications of the select subscribers (including subscriber information), such as usage category classifications (e.g., heavy use subscribers, average use subscribers, light use subscribers), network congestion, and/or the access sought by the select subscribers. In one implementation, rate limiting can be done by PCRF server 140 to select subscribers that meet a particular classification according to policy and subscriber information along with network information. Rate limiting can occur by identifying network packets with particular QCI (that can be marked by PGW 170) and enforcing the particular QCI by base stations 120 for packet control. For example, QCI for network packets can be changed to different QCI for select subscribers, as identified by one or more usage categories, to rate limit the select subscribers.

Additionally, rate limiting can be applied on a per base station 120 basis. In one implementation, rate limiting can be applied to base stations 120 that have high network congestion causing QoS problems, but not applied to base stations 120 that have low network congestion and are not suffering from network congestion causing QoS problems. For example, load level and/or QoS can be monitored and network congestion can be found on a specific base station 120. This specific base station 120 can have rate limiting occur for select subscribers to alleviate network congestion on this specific base station 120, while other non-network congested base stations 120 can continue without triggering rate limitations on similarly categorized subscribers.

Process 500 may include withdrawing rate limitations (block 560). Withdrawing rate limitations can be performed by one or more server devices, such as PCRF server 140 possibly in combination with base stations 120 and PGW 170. Withdrawing rate limitations can be based on the policy information, classifications of the select subscribers (including subscriber information), network congestion, and/or the access sought by the select subscribers. In one implementation, withdrawing rate limitations can be done when the period of high network congestion ends. For example, PCRF server 140 can remove rate limitation when the network congestion at base station 120 returns to a non-congested state.

In one implementation, a first threshold can be used to determine that network congestion exists when the network traffic exceeds the first threshold, and a second threshold can be used to determine that network congestion no longer exists when the network traffic does not exceed the second threshold. Additionally, the first threshold can be the same or different from the second threshold. For example, the first threshold can be a value higher than the second threshold to allow for a delay in rate limiting, but still allow for network congestion alleviation until the network congestion period ends.

A system and/or a method described herein may provide dynamic provisioning of subscribers to manage network traffic. Dynamic provisioning can be provided by monitoring load conditions, and dynamically adjusting priority settings for accessing the network by rate limiting select subscribers during times of heavy network congestion and removing the limitations for these select subscribers during times of light network congestion. Dynamic provisioning may also account for subscription by subscribers to premium services, which can allow premium subscribers to not be limited during times of heavy network congestion, or to have accessed to increased bandwidth during all times.

The foregoing description provides illustration and description, but is not intended to be exhaustive or to limit the implementations to the precise form disclosed. Modifications and variations are possible in light of the above disclosure or may be acquired from practice of the implementations.

While a series of blocks has been described with regard to FIG. 5, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor and executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   setting a first network threshold level for determining network congestion in a network;
   detecting an increase in network congestion at a base station above the first network threshold level;
   selecting one or more subscribers accessing the network via the base station,
   wherein the one or more subscribers are selected based on usage categories associated with the one or more subscribers,
   wherein the usage categories correspond to whether network usage, associated with each subscriber of the one or more subscribers, exceeds a subscriber threshold level,
   wherein the subscriber threshold level is based on policy information and subscriber information associated with each subscriber,
   wherein the policy information is based on information associated with the network and policies set for each usage category, and
   wherein the subscriber information is based on a plurality of factors, wherein the plurality of factors includes a first factor that includes whether each subscriber has subscribed to a service that includes a quality of service guarantee, a second factor that includes a current network usage, and a third factor that includes a minimum amount of bandwidth reserved for each subscriber during a previous period of network usage associated with each subscriber, and wherein the first factor and the second factor are weighted more heavily than the third factor when determining the subscriber information;
   rate limiting, by one or more servers, network traffic associated with the selected one or more subscribers, wherein the rate limiting includes sending a message to a network device indicating that the network traffic associated with the selected one or more subscribers is to be rate limited;
   detecting a decrease in network congestion at the base station below a second network threshold level; and
   removing the rate limiting on the selected one or more subscribers accessing the network via the base station in response to detecting the decrease.

2. The method of claim 1, where setting the first network threshold level comprises:
   configuring the policy information based on at least one of:
      historic or current usage of the network by the one or more subscribers,
      reserving bandwidth for one or more other subscribers during particular times of the day, or
      reserving bandwidth for one or more other subscribers during times of particular levels of network congestion, and
   compiling the policy information to set the first network threshold level.

3. The method of claim 1, wherein rate limiting network traffic associated with the selected one or more subscribers comprises:
   changing a quality of service (QoS) classification identifier (QCI) for data associated with the selected one or more subscribers; and
   instructing the network device to rate limit the network traffic based on the changed QCI.

4. The method of claim 1, wherein selecting the one or more subscribers comprises:
   detecting the one or more subscribers when the one or more subscribers are associated with usage categories that correspond to network traffic that exceeds the subscriber threshold level.

5. The method of claim 4, wherein detecting the one or more subscribers comprises:
   detecting historic usage data from a particular previous time period for the one or more subscribers; and
   detecting the one or more subscribers when the historic usage data exceeds the subscriber threshold level.

6. The method of claim 4, wherein detecting the one or more subscribers comprises:
   detecting current usage data from a current time period for the one or more subscribers; and
   detecting the one or more subscribers when the current usage data exceeds the subscriber threshold level.

7. The method of claim 4, further comprising:
   detecting one or more other subscribers associated with network traffic that does not exceed the subscriber threshold level; and rate increasing the network traffic associated with the one or more other subscribers.

8. A system comprising:
one or more devices configured to:
set a first network threshold level to determine network congestion in a network;
set rate limiting criteria to determine when subscribers will be rate limited, wherein the rate limiting criteria is based on usage categories associated with the subscribers,
wherein the usage categories are based on whether network usage, associated with each of the subscribers, exceeds a subscriber threshold level associated with each of the subscribers,
wherein the subscriber threshold level is based on policy information and subscriber information associated with each of the subscribers,
wherein the policy information is based on information associated with the network and policies set for each usage category, and
wherein the subscriber information is based on a plurality of factors, wherein the plurality of factors includes a first factor that includes whether each subscriber has subscribed to a service that includes a quality of service guarantee, a second factor that includes a current network usage, and a third factor that includes a minimum amount of bandwidth reserved for each of the subscribers during a previous period of network usage associated with each subscriber, wherein the first factor and the second factor are weighted more heavily than the third factor when determining the subscriber information;
detect an increase in network congestion at a base station above the first network threshold level;
identify one or more subscribers meeting one or more of the rate limiting criteria;
rate limit network traffic associated with the identified one or more subscribers by sending a message to a network device indicating that the network traffic associated with the identified one or more subscribers is to be rate limited;
detect a decrease in network congestion at the base station below a second network threshold level; and
remove the rate limiting of the network traffic associated with the identified one or more subscribers in response to detecting the decrease.

9. The system of claim 8, wherein the one or more devices set the first network threshold level by:
configuring the policy information based on at least one of:
historic or current usage of the network by the one or more subscribers,
reserving bandwidth for one or more other subscribers during particular times of the day, or
reserving bandwidth for one or more other subscribers during times of particular levels of network congestion, and
compiling the policy information to set the first network threshold level.

10. The system of claim 8, wherein, when rate limiting the network traffic associated with the identified one or more subscribers, the one or more devices are further configured to rate limit the network traffic associated with the one or more subscribers by:
changing a quality of service (QoS) classification identifier (QCI) for data associated with the identified one or more subscribers, and
instructing the network device to rate limit the network traffic based on the changed QCI.

11. The system of claim 8, wherein, when identifying the one or more subscribers meeting one or more of the rate limiting criteria, the one or more devices are further configured to:
detect historic usage data from a particular previous time period for the one or more subscribers; and
compare the historic usage data to the rate limiting criteria, wherein the rate limiting criteria includes a threshold amount of data for the particular previous time period for the one or more subscribers, and wherein the one or more subscribers meet the one or more rate limiting criteria when the historic usage data exceeds the threshold amount of data.

12. The system of claim 8, wherein, when identifying the one or more subscribers meeting one or more of the rate limiting criteria, the one or more devices are further configured to:
detect current usage data from a current time period for the one or more subscribers; and
compare the current usage data to the rate limiting criteria, where the rate limiting criteria includes a threshold amount of data for the current time period for the one or more subscribers, and wherein the one or more subscribers meet the one or more rate limiting criteria when the current usage data exceeds the threshold amount of data.

13. The system of claim 8, wherein the one or more devices comprise:
a policy charging and rules function (PCRF) device configured to:
receive load information to detect the increase in network congestion;
change a quality of service (QoS) classification identifier (QCI), for the one or more subscribers, from a first value to a second value to rate limit the one or more subscribers;
receive load information to detect the decrease in network congestion; and
return the QCI from the second value to the first value to remove the rate limit in response to detecting the decrease.

14. A non-transitory computer-readable medium comprising:
one or more instructions that, when executed by at least one processor, cause the at least one processor to:
set a first network threshold level for determining network congestion in a network;
set rate limiting criteria for determining when subscribers will be rate limited,
wherein the rate limiting criteria is based on usage categories associated with the subscribers,
wherein the usage categories correspond to whether network usage, associated with each of the subscribers, exceeds a subscriber threshold level,
wherein the subscriber threshold level is based on policy information and subscriber information associated with each of the subscribers,
wherein the policy information is based on information associated with the network and policies set for each usage category, and
wherein the subscriber information is based on a plurality of factors, wherein the plurality of factors includes a first factor that includes whether each subscriber has subscribed to a service that includes a quality of service guarantee, a second factor that includes a current network usage, and a third factor that includes a minimum amount of bandwidth reserved for each subscriber during a time of network usage associated with each subscriber, and wherein the first factor and the second factor are weighted more heavily than the third factor when determining the subscriber information;
detect an increase in network congestion at a base station above the first network threshold level;
identify one or more subscribers meeting one or more of the rate limiting criteria;
rate limit network traffic associated with the identified one or more subscribers by sending a message to a network device indicating that the network traffic associated with the identified one or more subscribers is to be rate limited;
detect a decrease in network congestion at the base station below a second network threshold level; and
remove the rate limiting of the network traffic associated with the identified one or more subscribers in response to detecting the decrease.

15. The computer-readable medium of claim 14, further comprising:
one or more instructions that, when executed by the at least one processor, cause the at least one processor to configure the policy information based on at least one of:
historic or current usage of the network by the one or more subscribers,
reserving bandwidth for one or more other subscribers during particular times of the day, or
reserving bandwidth for one or more other subscribers during times of particular levels of network congestion, and
compile the policy information to set the first network threshold level.

16. The computer-readable medium of claim 14, wherein the one or more instructions that cause the at least one processor to rate limit network traffic associated with the identified one or more subscribers comprise one or more instructions that, when executed by the at least one processor, cause the at least one processor to rate limit network traffic associated with the identified one or more subscribers by:
changing a quality of service (QoS) classification identifier (QCI) for data associated with the identified one or more subscribers; and
instructing the network device to rate limit the network traffic based on the changed QCI.

17. The computer-readable medium of claim 14, wherein the one or more instructions that cause the at least one processor to rate limit the network traffic associated with the identified one or more subscribers comprise one or more instructions that, when executed by the at least one processor, cause the at least one processor to rate limit the network traffic by:
detecting the one or more subscribers using amounts of data above the subscriber threshold level; and
rate limiting the network traffic associated with the identified one or more subscribers using amounts of data above the subscriber threshold level.

18. The computer-readable medium of claim 14, wherein the one or more instructions that cause the at least one processor to identify the one or more subscribers meeting the one or more of the rate limiting criteria further comprise one or more instructions that cause the at least one processor to:
detect historic usage data from a particular previous time period for the one or more subscribers; and
compare the historic usage data to the rate limiting criteria, wherein the rate limiting criteria includes a threshold amount of data for the particular previous time period for the one or more subscribers, and wherein the one or more subscribers meet the one or more rate limiting criteria when the historic usage data exceeds the threshold amount of data.

19. The computer-readable medium of claim 14, wherein the one or more instructions that cause the at least one processor to identify the one or more subscribers meeting the one or more of the rate limiting criteria further comprise one or more instructions that cause the at least one processor to:
detect current usage data from a current time period for the one or more subscribers; and
compare the current usage data to the rate limiting criteria, wherein the rate limiting criteria includes a threshold amount of data for the current time period for the one or more subscribers, and wherein the one or more subscribers meet the one or more rate limiting criteria when the current usage data exceeds the threshold amount of data.

20. The computer-readable medium of claim 14, further comprising:
one or more instructions that, when executed by the at least one processor, cause the at least one processor to:
receive load information to detect the increase in network congestion;
change a quality of service (QoS) classification identifier (QCI), for the one or more subscribers, from a first value to a second value to rate limit the one or more subscribers;
receive load information to detect the decrease in network congestion; and
return the QCI from the second value to the first value to remove the rate limit in response to detecting the decrease.

* * * * *